United States Patent [19]

Ramamurthy et al.

[11] Patent Number: 5,787,114
[45] Date of Patent: Jul. 28, 1998

[54] LOOP-BACK TEST SYSTEM AND METHOD

[75] Inventors: Krishnan Ramamurthy, Santa Clara, Calif.; Rong Pan, Aberdeen, N.J.; Francois Ducaroir, Santa Clara, Calif.

[73] Assignee: LSI Logic Corporation, Milpitas, Calif.

[21] Appl. No.: 586,174

[22] Filed: Jan. 17, 1996

[51] Int. Cl.$^6$ ...................................................... H04B 1/44
[52] U.S. Cl. .......................... 375/221; 375/224; 370/249
[58] Field of Search .................................. 375/220, 221, 375/222, 224, 377; 370/249, 366, 506

[56] References Cited

U.S. PATENT DOCUMENTS

| | | | |
|---|---|---|---|
| 4,048,445 | 9/1977 | Ghisler | 370/248 |
| 4,071,887 | 1/1978 | Daly et al. | 395/309 |
| 4,271,513 | 6/1981 | Maejima et al. | 371/20.5 |
| 4,308,472 | 12/1981 | McLaughlin | 327/18 |
| 4,402,075 | 8/1983 | Bargeton et al. | 370/249 X |
| 4,419,633 | 12/1983 | Phillips | 331/17 |
| 4,486,739 | 12/1984 | Franaszek et al. | 371/59 |
| 4,529,979 | 7/1985 | Kusama et al. | 340/825.05 |
| 4,564,933 | 1/1986 | Hirst | 371/20.2 |
| 4,573,017 | 2/1986 | Levine | 327/114 |
| 4,575,841 | 3/1986 | Fagerstedt et al. | 370/248 |
| 4,575,864 | 3/1986 | Rice, Jr. et al. | 375/368 |
| 4,613,979 | 9/1986 | Kent | 375/357 |
| 4,631,719 | 12/1986 | Huffman et al. | 370/249 |
| 4,751,469 | 6/1988 | Nakagawa et al. | 327/7 |
| 4,806,878 | 2/1989 | Cowley | 331/1 A |
| 4,908,819 | 3/1990 | Casady et al. | 370/204 |
| 4,975,916 | 12/1990 | Miracle et al. | 371/47.1 |
| 4,979,185 | 12/1990 | Bryans et al. | 375/293 |
| 4,988,901 | 1/1991 | Kamuro et al. | 327/18 |
| 5,010,559 | 4/1991 | O'Connor et al. | 375/368 |
| 5,025,458 | 6/1991 | Casper et al. | 375/365 |
| 5,028,813 | 7/1991 | Hauck et al. | 327/20 |
| 5,040,195 | 8/1991 | Kosaka et al. | 375/365 |
| 5,043,931 | 8/1991 | Kovach et al. | 364/579 |
| 5,052,026 | 9/1991 | Walley | 375/373 |
| 5,088,112 | 2/1992 | Pyhalammi et al. | 375/377 X |
| 5,111,451 | 5/1992 | Piasecki et al. | 370/294 |
| 5,126,690 | 6/1992 | Bui et al. | 331/1 A |
| 5,159,279 | 10/1992 | Shenoi et al. | 327/2 |
| 5,180,993 | 1/1993 | Dent | 331/16 |
| 5,200,979 | 4/1993 | Harris | 375/292 |
| 5,251,217 | 10/1993 | Travers et al. | 370/538 |
| 5,265,089 | 11/1993 | Vonehara | 370/249 |
| 5,268,652 | 12/1993 | Lafon | 331/1 A |
| 5,274,668 | 12/1993 | Marschall | 375/224 |
| 5,299,236 | 3/1994 | Pandula | 375/368 |
| 5,301,207 | 4/1994 | Emerson et al. | 370/249 X |
| 5,327,103 | 7/1994 | Baron et al. | 331/1 A |
| 5,337,306 | 8/1994 | Hall | 370/249 |
| 5,343,461 | 8/1994 | Barton et al. | 370/249 |
| 5,353,250 | 10/1994 | McAdams | 365/189.03 |
| 5,379,409 | 1/1995 | Ishikawa | 395/183.13 |
| 5,398,270 | 3/1995 | Cho et al. | 377/39 |
| 5,448,571 | 9/1995 | Hong et al. | 370/514 |
| 5,473,758 | 12/1995 | Allen et al. | 395/430 |
| 5,481,543 | 1/1996 | Veltman | 370/473 |
| 5,550,802 | 8/1996 | Worsley et al. | 370/254 X |
| 5,559,854 | 9/1996 | Suzuki | 379/27 |
| 5,577,039 | 11/1996 | Won et al. | 370/466 |

*Primary Examiner*—Young T. Tse
*Attorney, Agent, or Firm*—Kevin L. Daffer; Conley, Rose & Tayon

[57] ABSTRACT

A loop back test system and method for providing local fault detection within the core or macrocell of an integrated I/O interface device on an integrated circuit is disclosed. The system and method of this invention is suitable for use in any I/O interface having both a transmitter and a receiver section. The loop back of input test data from the transmitters output directly to the receiver's input permits fault detection within the core of an integrated I/O interface. By illustration, in a serializer/deserializer I/O, the loop back of serialized, alignment pattern encoded parallel data from the output stage of the I/O transmitter to the receiver's input stage permits identifying faults occurring within the integrated I/O transceiver macrocell. The loop back test system and method of this invention permits fault isolation of within the boundaries of the I/O core and independent of external logic or testers.

20 Claims, 2 Drawing Sheets

LOOP-BACK TEST SYSTEM AND METHOD

CROSS REFERENCE TO RELATED APPLICATIONS

This application is being filed concurrently with the following applications, and these are incorporated herein by reference: U.S. patent application Ser. No. 08/596,816 filed Feb. 5, 1996 for a FAST SYNCHRONIZATION METHOD; U.S. patent application Ser. No. 08/597,896 filed Feb. 5, 1996 for a HIGH SPEED PHASE LOCKED LOOP TEST METHOD AND MEANS; U.S. patent application Ser. No. 08/586,171 filed Jan. 17, 1996 for a METHOD FOR INTERLEAVING NETWORK TRAFFIC OVER SERIAL LINES; U.S. patent application Ser. No. 08/586,172 filed Jan. 17, 1996 for a SELF TEST OF CORE WITH UNPREDICTABLE LATENCY; U.S. patent application Ser. No. 08/586,173 filed Jan. 17, 1996 for a WRAP-BACK TEST SYSTEM AND METHOD; and U.S. patent application Ser. No. 08/596,978 filed Feb. 5, 1996 for a PROGRAMMABLE SYNCHRONIZATION CHARACTER.

FIELD

This invention relates to systems and methods for testing electronic circuits and, more particularly, to such systems and methods for on-chip loop-back diagnostics of core input/output interface circuitry having both analog and digital portions.

BACKGROUND:

Integrated circuits are becoming increasingly more complex as more core devices and supporting logic are integrated onto a single chip. This is driven, in part, from the need to provide increased functionality in less space, with lower power consumption and with higher bandwidths. These product performance requirements force integrated circuit designers to populate a single chip with several devices which may include controllers, memory blocks, processors, and input/output (I/O) interfaces to provide a complex integrated circuit.

As an example, improvements in microprocessor performance has resulted in data transfer bandwidths that typically outpace I/O transfer rates. Parallel I/O bus bottlenecks result in performance compromises in peripheral and network interfaces, and accordingly have spurred the development of high-speed serial transfer methods. Unlike conventional protocols where data is transferred over multiple wires, parallel data is converted into a high-speed, serial data stream. The serial data stream is typically converted back to parallel data at a receiving peripheral device for application with the particular logic in that device. Integration of such I/O interfaces as part of a complex integrated circuit on a single chip is consistent with proximally locating the I/O serializer/deserializer with the devices that are either transmitting or receiving the data, thus avoiding I/O bus bandwidth limitations and enabling higher data transfer rates.

High levels of device integration onto a single chip, while reducing the chip count on a board, will increase the unit cost of the integrated circuit. This is principally due to lower manufacturing yields resulting from the increased process complexities associated with the manufacture of such highly integrated devices, as well as the yield impact attendant with the additional process steps required to fabricate these chips.

Accordingly, it is well known that the likelihood of a manufacturing defect increases as chip complexity increases. Core device tolerances become increasingly critical as the devices are packed closer together and are required to operate and interact at higher bandwidths. Deviation from these tolerances can cause defects in the chips resulting in lower process yields, and increased screening of finished goods, resulting in higher per unit costs. Also, the additional process steps associated with the fabrication of these highly integrated circuits provide further opportunities for defects and thus increased cost due to lower manufacturing yields.

The high cost of manufacturing these complex integrated circuits makes it desirable, therefore, to identify product defects as early in the manufacturing process as possible, thus avoiding the expense of further processing an otherwise defective chip. Also, early manufacturing rejection of defective parts reduces the amount of screening required of the finished product. Accordingly, where an I/O interface is incorporated with a core device on an integrated circuit, it is desirable to test the I/O interface during manufacture, or prior to assembly of the integrated circuit onto a board, to determine if the I/O interface is operating to specification before additional time and money are expended to complete the fabrication of what might otherwise be a defective device or to replace or repair a board populated with such a defective device.

Currently there are no commercially available testers capable of testing an embedded, high-speed I/O interface at the I/O interface design limits. Current testing devices and hardware are limited to data transfer rates of up to about 500 Mb/sec. Consequently, serializer/deserializer I/O interfaces capable of data transfer rates exceeding 500 Mb/sec cannot be tested to the limits of the I/O interface's data transfer rate performance specification on testers that are commercially available today. To compound the problem, merely testing the I/O interface at a commercially available tester's highest data transfer rate is not an acceptable solution because many high-speed I/O interface devices are incapable of operating at the relatively lower speeds limiting these testers. Further, even if the device could be tested at these lower data rates, such a test is not indicative of the integrity or quality of the I/O interface device since it is not being tested at its full operating data transfer rate; indeed some high-speed serializer/deserializer interfaces are incapable of operation at such relatively lower test data transfer rates. Accordingly, testing of embedded I/O interface devices using commercially available testers is not possible. Consequently, confirmation of the operability and performance of the embedded I/O is not possible until the chip on which the I/O is assembled is at least assembled at the board level, at which time any defect detected becomes more costly to repair or replace.

Loop back testing of I/O interfaces is currently performed only indirectly, with the chip containing the I/O interface already installed onto a board, or at least in combination with either other chips on a completed card or as part of the entire communications system in which the card is component. With this method of testing, it cannot be determined which chip on a card or which device on a chip is defective in the event a fault is detected since resolution of such a test does not extend to the chip or intra-chip level. As a result, either the entire board is discarded or further testing is required in order to identify the defective board component so that it might be replaced. Such fault testing is not optimal in the sense that significant cost can be avoided if it can be determined that the I/O interface is defective early in the fabrication of the component chip containing the I/O interface core.

Accordingly, there is a need for on-chip diagnostics systems and methods for high-speed core I/O interface devices so that defects may be detected as early as possible during the manufacturing process, or before the integrated chip is installed onto a board.

Kovach et al., U.S. Pat. No. 5,043,931, teaches a wrap back diagnostic capability on analog-to-digital conversion systems, for example audio digitizing capture and playback adapter cards. They teach a connector system on an I/O card having a first state wherein digital-to-analog converter (DAC) outputs are automatically, internal to the card, routed to corresponding analog-to-digital converter (ADC) inputs thereby closing a wrap loop whereupon automated DAC to ADC loop tests are performed. They also teach a second switching state which is provided automatically upon insertion of connector plugs (such as miniature audio plugs) into the connector system whereby the loop is broken and the DAC outputs and ADC inputs are made available externally to respective output and input connectors for normal operation of the card. Their system will detect I/O faults only after the component chips have been fabricated and after assembly onto a card. Their system will not detect defects during manufacture, or prior to installation onto a board, of the I/O chip, nor do they teach self diagnostics of an embedded high-speed I/O core in an integrated circuit having multiple devices on the same chip.

Marshall, U.S. Pat. No. 5,274,668, teaches using the demodulator circuit of his invention as a component in a signal processing circuit. The signal processing circuit is shown as consisting of several integrated circuits including a digital transmitter-receiver integrated circuit as a non-integrated additional board component. The digital transmitter-receiver integrated circuit is shown as having an internal feedback loop going from the output of the transmitter to the input of the receiver. Data looped back from the transmitter is compared off-chip in a processor circuit with the original data. This test is unsuitable for the early detection of defects in the manufacturing process of a core high-speed I/O interface of an integrated circuit. As taught, this test scheme requires two separate integrated circuits. The signal comparison in this circuit is performed by a different, separate integrated circuit (the "processor") thus making possible the loop-back test only after the board has been assembled. Consequently, self-diagnostic loop-back testing of the digital transmitter-receiver core cannot be performed during the manufacturing of the transmitter-receiver core, or tested as a single device, since the additional processor integrated is required to perform the test.

Other wrap-back or loop-back diagnostic systems are typified by Barton et al., U.S. Pat. No. 5,343,4611. They describe a facility-level loop-back test, diagnostic and maintenance system having a digital transmission facility, transmission medium, and at least one microprocessor-based, full duplex facility loop-back diagnostics interface located at predetermined end-user locations within their system. Their system is intended to fault test an entire system, such as a local area network, wide area network, or telephone system. Their system fault testing will not identify faults up to the I/O interface circuit. A failed circuit within the I/O interface circuit will not be detected by this system or any other system wherein the loop-back or wrap back is performed off-chip and includes external elements such as transmission lines, wires, fiber-optic cable, other logic, and the like.

Loop-back testing between optical transceivers is disclosed by Piasecki et al., U.S. Pat. No. 5,111,451. They describe using a loop back test in diagnosing problems with an optical modem system. Again, the disclosure is directed to an assembled device and for diagnosing problems that might arise once the optical modem is installed.

Other background art is directed to loop-back testing schemes of data communication systems whereby such testing does not interfere with the availability of the communications system. Casady et al., U.S. Pat. No. 4,908,819, is directed to an integrated data voice multiplexer (IDVM) capable of simultaneously supporting loop-back and communication handshake protocols with no performance degradation. He shows a wide-area like network wherein data is transmitted using frequency shift keyed modulation of two or more carrier signals. The presence or absence of carrier signals is used to indicate a loop-back state. Their invention is again directed to a completed, installed macro-system, and improves over Barton et al and the like, by providing for loop-back testing without interfering with the availability of the system.

Accordingly, there is a need to provide a core-level, on-chip self-test loop-back test system of a high-speed I/O interface core to provide a means for fault testing I/O interface circuits contained on an integrated circuit, so that the defective I/O interface circuit may be identified as early as possible in the manufacturing process, or prior to the assembly of the integrated circuit onto a board.

THE INVENTION

OBJECTS

It is among the objects of this invention to provide a loop-back self test system in a core I/O interface device in an integrated circuit to permit early detection of I/O interface defects during its manufacture, and to enable loop-back fault detection at intra-chip, chip-to-chip, and board-to-board resolutions; and It is another object of this invention to provide a method for performing internal, high-speed loop-back testing within an I/O interface circuit core.

Still other objects, features, aspects and advantages of the present invention will become apparent from the following Summary and Detailed Description of the present invention, when taken in conjunction with the accompanying drawings.

SUMMARY

This invention is directed to on-chip diagnostics, including loop-back testing, of an embedded I/O interface core on an integrated circuit. A core is defined as a fully defined, optimized, and reusable block of logic, which supports industry-standard functionality, and has predefined timing and layout. The integrated circuit may consist of a plurality of core devices or it may be as simple as at least one I/O interface circuit. A loop-back test is defined as a performance test of the entire core domain. Data is diverted entirely within the core domain for the purpose of ascertaining the proper functioning of all blocks or sections, both digital and analog, of the core. Proper performance of these sections is determined by comparing the integrity of the looped-back test. data with the original test data. A loop-back test typically redirects the transmitter output test data and routes it to the input of the receiver of the core, thus subjecting the test data to all of the functional elements of the core.

Any I/O interface which changes the attributes of the data being transmitted may benefit from the loop back system and method of this invention. By way of example and not by limitation, the system and method of this invention may be applied to inverse multiplexers commonly used in the telecommunications industry wherein high speed serial data is bandwidth spread across a plurality of lower bandwidth channels and converted back again at the receiver, or in analog/digital I/Os. In the preceding examples the output data is of a different format than the input data at the transmitter, and the receiver converts the output data to the same format as the input data. Loop-back testing may be performed on both of the foregoing I/O devices.

By way of illustration and not by limitation, the loop-back test system and method of this invention are exemplified by application to a full-duplex transceiver having a serializer/deserializer I/O interface. In this embodiment, parallel data is received into a serializer portion of the I/O core where it is serialized, stored in a transmit buffer, and exits the transmit buffer as serial data at a data rate equal to the product of the width of the parallel stream and the parallel data rate. The receiver portion of the I/O interface receives serial data into a receive buffer, directs the stored data into a deserializer where it is converted to parallel data, the parallel data is directed into a data alignment unit (DAU) where a reference clock signal is extracted from the serial data, and the parallel data is realigned and synchronized with the reference clock. This device may be provided as a core device on an integrated circuit having other core logic from which I/O parallel data is generated or applied, or it may reside as a core device on an integrated circuit either as a stand-alone circuit or as an array of such devices.

In the loop-back mode, a loop-back request is asserted to the I/O core. Upon receiving the loop-back request, test serial data (derived from test parallel data) exiting the transmit buffer is routed from the output of the transmit buffer to the receive buffer. Rerouting of serial data occurs entirely within the I/O core and requires no external connections. The serial data is converted back to parallel data, the alignment pattern extracted, and the parallel data aligned and synchronized. The reconstructed parallel data is then compared to the original test data. Test data may be supplied to the transmitter portion of the I/O interface either externally or by test data stored in a built-in self-tester (BIST). The BIST may optionally provide an error output signal to indicate when the sent and received data do not match, and an error counter and error trace buffer may be used to help identify the nature of the error and the bit-error rate. The output of the error counter and error trace buffer may be made available by means of a dedicated output bus. A feature of this invention is that the loop-back test is performed entirely on-chip and tests both the digital portion and the analog portion of the I/O core.

A feature of the fully self-contained loop-back test of this invention is that it allows for the capability of testing the I/O core in an integrated circuit prior to completion of the manufacturing process, or prior to assembly of the integrated circuit onto a board at the rated data transfer rates. By having the ability to perform a totally on-chip loop-back test to test the I/O core, chips having defective I/O interfaces may be rejected relatively early in the manufacturing process. This not only avoids the time and costs associated with the later screening of finished goods, but also reduces the overhead associated with the further manufacture of defective product, including additional process and test equipment and machine operators.

An additional advantage of the on-chip loop-back test of this invention is that the loop-back inputs may be taken off-chip, thus allowing external logic to enable the core's parallel loop-back mode. This ability to request a loop-back test of the I/O interface is permitted by making accessible the loop-back request inputs of the core as available pins on the integrated circuit.

As high-speed serial communications becomes more prevalent, particularly in backplane connectivity in systems with multiple boards, in chip-to-chip connectivity on the same board, and in core-to-core connectivity between devices on the same chip, the current loop-back and wrap-back tests as described in the background art are inadequate. Diagnostic tests which merely identify faults relating to communication elements external to the system, such as transmission cables and remote terminals, do not have the required resolution to isolate faults within the system such as between boards, between chips, or between core devices within a chip. Given the complexity of the chips, boards and systems currently in use today, loop-back tests and wrap-back tests capable of providing such resolution are desirable for intra-system diagnostics. The capability of accessing the wrap-back and loop-back test modes of the I/O core may be desirable, for example, where the integrated circuit containing the I/O interface having the on-chip loop-back test of this invention has been placed in service and such a test becomes necessary as part of a maintenance protocol.

DRAWINGS

The invention is illustrated by reference to the drawings, in which.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 1:
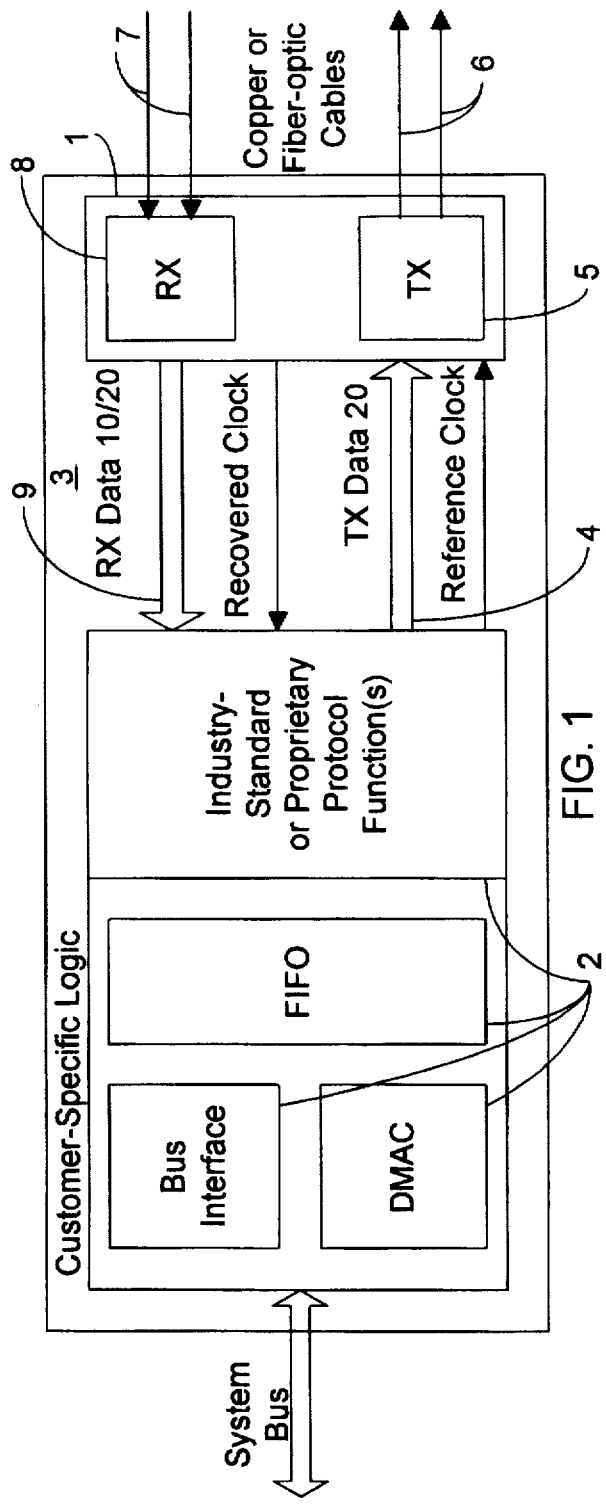
FIG. 1 shows a system block diagram of a typical integrated circuit having an I/O serializer/deserializer interface core integrated thereon.

FIG. 1 is a system block diagram showing an I/O interface core 1 integrated with other logic devices 2 on an integrated circuit chip 3. Parallel data 4 from other integrated logic devices 2 is received by the transmitter portion 5 of the I/O interface core 1, is converted to serial form, and exits the transmitter portion 5 as serial data 6 for serial communication with off-chip external elements. Off-chip serial data 7 is received by the receiver portion 8 of the I/O interface is converted into parallel data 9 and exits the receiver portion 8 for parallel communication with the other integrated logic devices 2.

Figure 2:
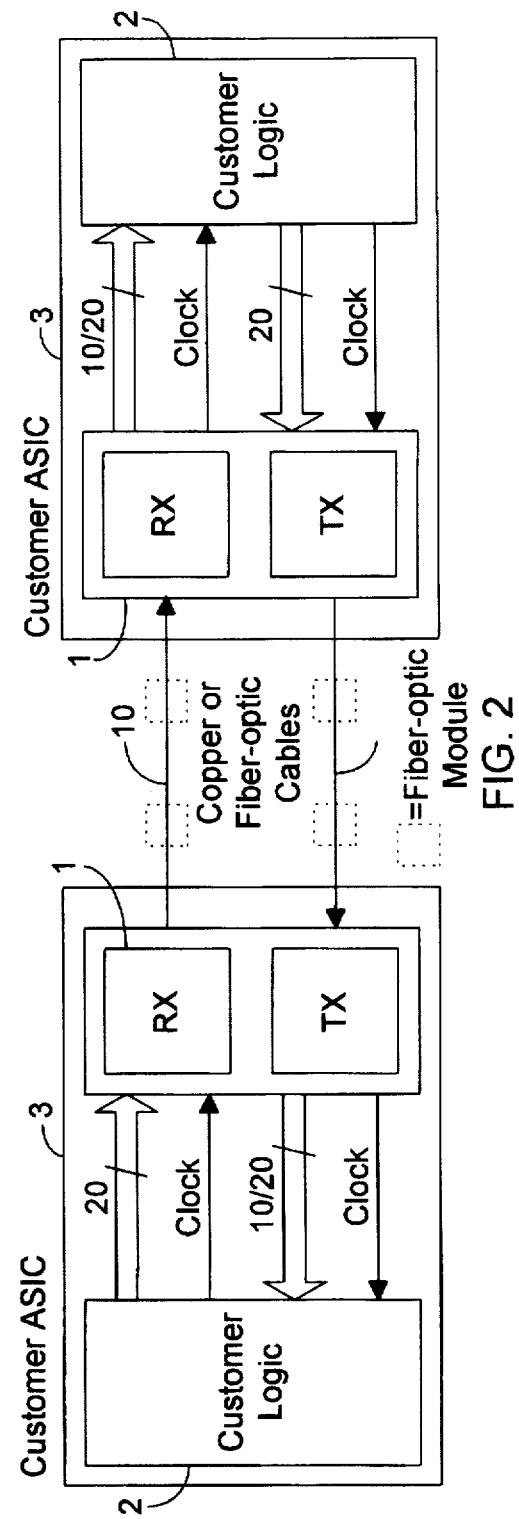
FIG. 2 illustrates the interconnectivity of two integrated circuits each having an I/O serializer/deserializer interface core integrated thereon.

FIG. 2 is shows two integrated circuits 3, 3' having an I/O interface core 1, 1' integrated into each chip, in serial communication with one another. The transmission means 10 includes wire, fiber optics, microwaves, and the like. The customer logic 2, 2' may be a single core device or be comprised of a plurality of core devices operatively connected with one another and to the I/O interface to provide a specific application or function.

Figure 3:
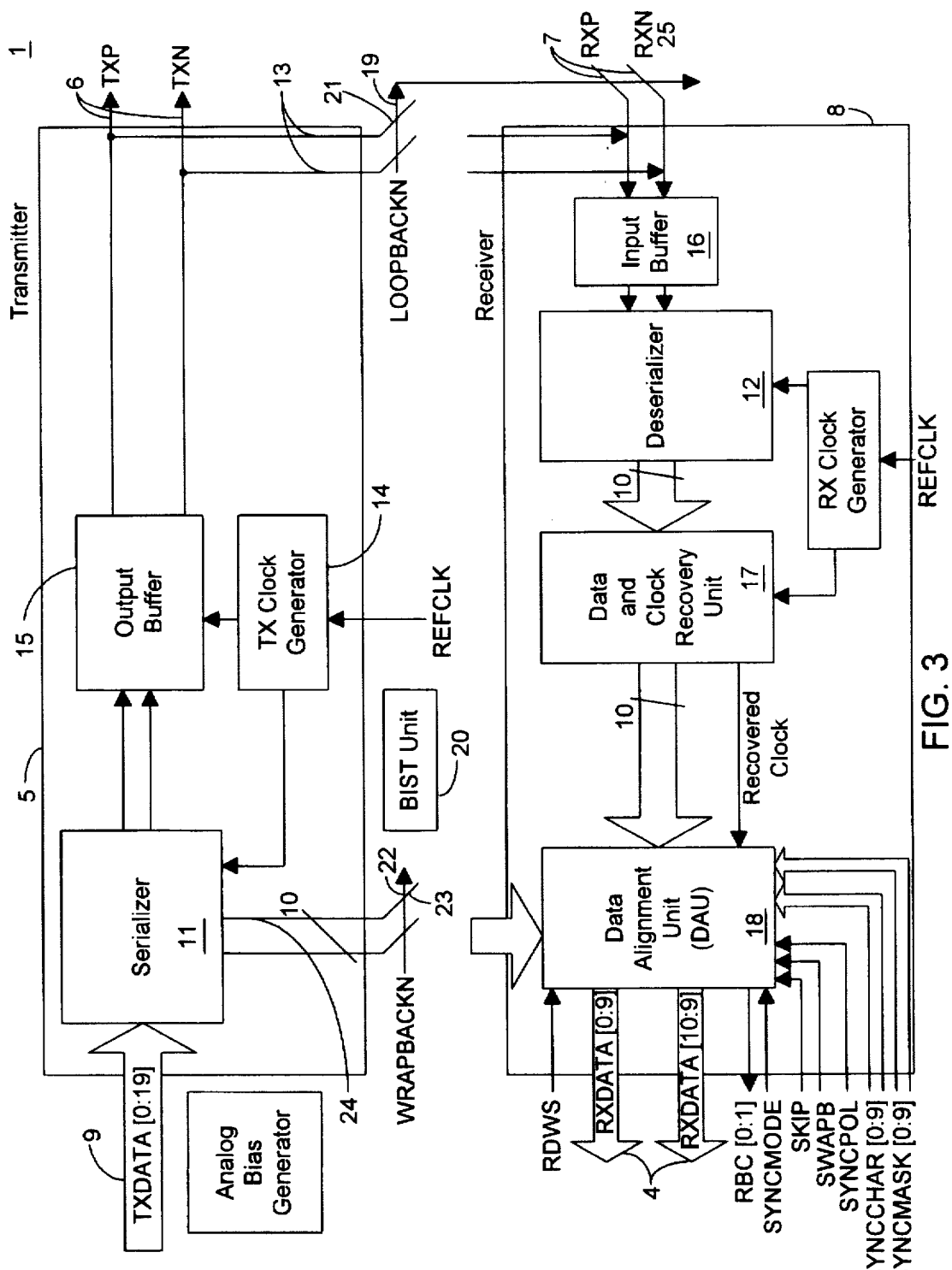
FIG. 3 is a block diagram of an I/O serializer/deserializer interface core incorporating the wrap-back system of this invention.

FIG. 3 is a core block diagram of an I/O circuit embodying the loop-back device of this invention on the chip. During normal operation, parallel data, having an alignment pattern encoded thereon, from either other core devices or from an external, off-chip device is clocked into the serializer portion 11 of the transmitter portion 5 of the I/O interface 1, the clock signal being provided by the clock generator 14. The parallel data is serialized in the serializer portion. The serial data is conveyed to the transmit output buffer 15 where it is then transmitted as a transmit serial data pair 6, for receipt by an off-chip serial receiver. Incoming serial data is received as a receive serial pair 7 and is directed into an input buffer 16. The serial data is converted in the deserializer to parallel data, and the embedded clock signal, if any, is recovered in the data and Clock Recovery Unit 17. The parallel data is aligned with the recovered clock signal in a Data Alignment Unit and exits the I/O core as synchronized parallel data 4.

The serial data loop-back mode verifies the complete functionality of the core, including both digital and analog circuits. Again referring to FIG. 3, to initiate the loop-back test mode, a request for loop-back test is asserted from off-chip to generate a loop-back test request signal 19. Pseudo-random or other parallel test data may be supplied from off-chip or alternately, the parallel test data may be supplied on-chip by a built-in self test (BIST) unit 20. An internal loopback switching circuit 21 redirects the serial data and prevents the serial data 6 from exiting the I/O core. The switching circuit 21 may be of any type appropriate for shunting serialized output test data from the output buffer to the receiver buffer while maintaining a direct current balance in the device. Such designs are known to those of ordinary skill digital circuit design. The devices used in the circuit may include FET, bipolar, or other semiconductor devices or combinations known by those of ordinary skill in digital circuit design. Once the serial data reaches the receiver, it is internally diverted by switching circuit 25 to the input buffer 16 of the receiver portion 8 of the I/O core. The switching circuit 25 may be of any type appropriate for directing serialized output test data into the receiver buffer while maintaining a direct current balance in the device. Preferably, the switching circuit 25 will prevent external, incoming serial data from entering the receive buffer when the loop back test request is asserted. Such designs are known to those of ordinary skill digital circuit design. The devices used in the circuit may include FET, bipolar, or other semiconductor devices or combinations known by those of ordinary skill in digital circuit design. Preferably, the loopback switching circuit 21 also prevents externally generated serial data from entering the input buffer during loop back testing. By internally connecting the transmitted serial data 6 directly to the input buffer 16, the line loop-back bypass trace 13 is isolated from signals outside the core. The parallel test data is reconstructed in the Data and Clock Recovery Unit 17, and aligned and synchronized in the DAU 18. The reconstructed parallel data is compared to the original input test data to determine the bit error rate of the I/O core interface circuit. Although not shown, the BIST unit may contain an error counter and error trace buffer. These devices would determine the bit-error rate and characterize the error type or source. The results of the analysis may be accessed externally via an error report bus.

Although the present invention described herein and above are preferred embodiments, it is understood that after having read the above description, various alternatives will become apparent to those persons skilled in the art. For example, the loop back system and method of this invention may be used in any integrated I/O device having both a transmitter and a receiver in the same macrocell or core, and where input data is converted from a first format to provide output data at a second for output, and where data is received in the second format and reconverted to the first format. Accordingly, the loop back system and method of this invention may be used in analog/digital to digital/analog I/Os, and in telecommunications inverse multiplexer I/Os. We therefore wish our invention to be defined by the scope of the appended claims as broadly as the prior art will permit, and in view of the specification.

We claim:

1. A loop back test system for detection of intra-domain errors of an integrated I/O interface core of an integrated circuit, comprising in operative combination:
    a) an integrated transmitter, said transmitter comprising:
        i) a transmitter input stage for receiving transmitter input data, said input date encoded with an alignment pattern and said input data having a first format, and
        ii) a transmitter converter stage for converting said transmitter input data into transmitter output data, said output data having a second format;
    b) an integrated receiver, said receiver comprising:
        i) a receiver converter stage for buffered receiving said transmitter output data for conversion of said transmitter output data to said first format to provide received reconverted data,
        ii) a receiver alignment stage for extracting said alignment pattern from said received reconverted data, and for aligning said received reconverted data to conform to timing of said transmitter input data;
    c) a first switching circuit in electrical cooperation with said transmitter converter stage having a first open condition, and a second closed condition, said second closed condition for shunting transmitter output data to said receiver converter stage to provide loop back data to said receiver converter stage, said first switching circuit second closed condition being enabled upon assertion of a loop back signal to the I/O interface core;
    d) a second switching circuit in electrical cooperation with said receiver converter stage having a first open position to permit receipt of externally transmitted data, and a second closed condition for receiving an input test data for reconversion, and alignment of the reconverted input test data to provide an output test data, and for halting receipt of the externally transmitted data upon assertion of the loop back signal to the I/O interface core; and
    e) an error analysis circuit for comparing said output test data with said input test data.

2. A loop back test system as in claim 1 wherein said I/O interface core is a serializer/deserializer interface core for converting alignment coded parallel formatted data to serial formatted data for transmission, and for converting serial formatted data to parallel formatted data for reception.

3. A loop back test system as in claim 2 further comprising an in-core built-in self-test (BIST) circuit for providing pseudo-random, alignment of encoded said input test data to said transmitter input stage.

4. A loop back test system as in claim 1 wherein said first switching circuit includes semiconductor switching devices, said first switching circuit being designed to maintain the direct current balance of the I/O interface core.

5. A loop back test system as in claim 4 wherein said semiconductor switching devices are MOSFET transistors.

6. A loop back test system as in claim 1 wherein said second switching circuit includes semiconductor switching devices, said second switching circuit being designed to maintain the direct current balance of the I/O interface core.

7. A loop back test system as in claim 6 wherein said semiconductor switching devices are MOSFET transistors.

8. A loop back test system as in claim 1 wherein said error analysis circuit is disposed in an in-core built-in self-test (BIST) circuit and includes an error counter and error trace buffer for determining and reporting the bit-error rate of the output test data as compared to the input test data.

9. A loop back test system for detection of intra-domain errors of an integrated I/O interface circuit core of an integrated circuit, comprising in operative combination:
   a) means for transmitting data, said transmitting means comprising:
      i) a transmitter input means for receiving input data, said input data encoded with alignment pattern, and said input data having a first format, and
      ii) a data conversion means for converting said input data from said first format into a second format;
   b) means for receiving transmitted data, said receiving means comprising:
      i) a receiver conversion means for buffered receiving transmitted output data having said second format, and converting said transmitted output data from said second format to said first format to provide received reconverted data, and,
      ii) a receiver data alignment means for extracting said encoded alignment pattern from the reconverted data, and for aligning the reconverted data to conform to timing of said transmitter input data timing;
   c) a first switching means in electrical cooperation with said data conversion means for switching converted input test data from said data conversion means to said receiver conversion means upon assertion of a loop back signal to the I/O interface circuit core, said converted input test data encoded with the alignment pattern;
   d) a second switching means in electrical cooperation with said receiver converter stage having a first open position to permit receipt of externally transmitted data, and a second closed condition for receiving an input test data for reconversion, and alignment of the reconverted input test data to provide an output test data, and for halting receipt of the externally transmitted data upon assertion of the loop back signal to the I/O interface circuit core; and
   e) an error analysis means for comparing said output test data with said input test data.

10. A loop back test system as in claim 9 wherein said I/O interface circuit core is a serializer/deserializer interface for converting alignment coded parallel formatted data to serial formatted data for transmission, and for converting serial formatted data to parallel formatted data for reception.

11. A loop back test system as in claim 9 further comprising an in-core built-in self-test (BIST) means for providing pseudo-random, alignment of encoded, said input test data to said transmitter input stage.

12. A loop back test system as in claim 11 wherein said error analysis means is disposed in the BIST means and includes an error counter and error trace buffer for determining and reporting the bit-error rate of the output test data as compared to the input test data.

13. A loop back test system as in claim 9 wherein said first data switching means includes semiconductor switching devices, said first data switching means being designed to maintain the direct current balance of the I/O interface circuit core.

14. A loop back test system as in claim 13 wherein said semiconductor switching devices are MOSFET transistors.

15. A loop back test system as in claim 9 wherein said second data switching means includes semiconductor switching devices, said second data switching means being designed to maintain the direct current balance of the I/O interface circuit core.

16. A loop back test system as in claim 15 wherein said semiconductor switching devices are MOSFET transistors.

17. A loop back test method for detection of intra-domain errors of an integrated I/O interface core of an integrated circuit, comprising the following steps in any operative order:
   a) providing the integrated I/O interface core having both a transmitter section and a receiver section, said transmitter section comprising:
      i) a transmitter input stage for receiving transmitter input data, said input data encoded with an alignment patter and said input data having a first format, and
      ii) a transmitter converter stage for converting said input data into transmitter output data, said output data having a second format,
   and said receiver section comprising:
      iii) a receiver converter stage for receiving said transmitter output data for conversion of said output data to said first format to provide received reconverted data,
      iv) a receiver alignment stage for decoding said alignment pattern from said received reconverted data, and for aligning said received reconverted data to conform to timing of said transmitter input data;
   said transmitter input stage further comprising:
      v) a first switching circuit in electrical cooperation with said transmitter input stage having a first open condition, and a second closed condition, said second closed condition for shunting transmitter input test data from said transmitter converter stage to said receiver converter stage to provide loop back data to said second receiver converter stage, said first switching circuit second closed condition being enabled upon assertion of a loop back signal to the I/O interface core, and
   said receiver further comprising:
      vi) a second switching circuit in electrical cooperation with said receiver converter stage having a first open position to permit receipt of externally transmitted data, and a second closed condition for receiving said loop back data for reconversion of said loop back data to said first format to provide output test data, and for halting receipt of said externally transmitted data, said second closed condition being enabled upon assertion of the loop back signal to the I/O interface core; and
   an error analysis circuit for comparing said output test data with said input test data,
   b) asserting a loop back test enable signal to the I/O interface core to enable said second closed condition of said first switching circuit, and to enable said second closed condition of said second switching circuit;
   c) inputting said transmitter input data into said transmitter input stage, said input test data encoded with the alignment pattern;
   d) converting said input test data in said transmitter converter stage from the first format to the second format;
   e) shunting said input test data directly to a said receiver converter stage for conversion of said input test data from said second format to said first format;
   f) decoding said alignment pattern from said input test data for alignment of said input test data;

g) aligning said input test data to provide aligned output test data; and h) comparing said aligned output test data with said input test data.

18. A loop back test method as in claim 17 wherein said I/O interface core is a serializer/deserializer I/O interface core.

19. A loop back test method as in claim 17 wherein said step of asserting the loop back test enable signal is initiated off-chip via a loop back enable pin on the integrated circuit accessible off-chip.

20. A loop back test method as in claim 17 wherein said comparing step is performed by an in-core built-in self-test (BIST) circuit, said BIST circuit includes an error counter and error trace buffer for determining and reporting the bit-error rate of the output test data as compared to the input test data.

* * * * *